United States Patent [19]

Bauer et al.

[11] 4,203,960

[45] May 20, 1980

[54] COKE DESULPHURIZATION

[75] Inventors: William V. Bauer, New York, N.Y.; Jose A. C. Isaacs; Oliverio M. Lamonte, both of Edo de Mexico, Mexico

[73] Assignee: The Lummus Company, Bloomfield, N.J.

[21] Appl. No.: 933,809

[22] Filed: Aug. 15, 1978

[51] Int. Cl.² .................... C01B 31/02; C10B 57/00
[52] U.S. Cl. ................................. 423/461; 423/445; 201/17
[58] Field of Search .................. 423/461, 445; 201/17

[56] References Cited

U.S. PATENT DOCUMENTS

| | | | |
|---|---|---|---|
| 2,657,118 | 10/1953 | Phillips et al. | 423/461 |
| 2,716,628 | 8/1955 | Weikert | 201/17 |
| 2,819,204 | 1/1958 | Martin | 201/17 |
| 4,011,303 | 3/1977 | MacGregor | 423/461 |
| 4,013,426 | 3/1977 | Schroeder | 44/1 R |

Primary Examiner—O. R. Vertiz
Assistant Examiner—Gregory A. Heller
Attorney, Agent, or Firm—Louis E. Marn; Elliot M. Olstein

[57] ABSTRACT

Coke is desulphurized by sequentially heating the coke to desulphurization temperatures, and maintaining the coke at desulphurization temperatures to effect desulphurization thereof, the coke reaching a temperature of at least 1000° C. (preferably at least 1100° C. and, more preferably at least 1200° C.) during desulphurization, and cooling being effected by direct countercurrent contact with a gas and, all or a portion of the heating being effected by direct countercurrent contact with the gas, with the heat released from the coke during cooling being recuperated by the gas and employed to provide most of the heating to bring the coke to desulphurization temperature. The coke and/or gas is heated between the cooling and heating steps to maintain the gas at a temperature below the coke during cooling and at a temperature above the coke during heating. The gas is preferably recirculated as hydrogen present in the gas, as the result of cracking of hydrocarbon in the volatiles released from the coke, accentuates desulphurization.

22 Claims, 3 Drawing Figures

COKE DESULPHURIZATION

This invention relates to desulphurization, and more particularly to the desulphurization of coke.

Coke produced from both petroleum and coal sources, in many cases, has a sulphur content in excess of that which can be tolerated for desired end use. Thus, for example, coke can be employed as a raw material for electrode production, and in such a case, the sulphur content should be reduced as much as possible, generally to less than 2.8%, and most generally to less than 1.5%. Coke when used as a fuel, should have a sulphur content of less than 0.8 weight percent.

The present invention is directed to a new and improved process for effecting desulphurization of coke.

In accordance with the present invention, there is provided a process for the desulphurization of coke by sequentially heating coke to desulphurization temperatures, maintaining the coke at desulphurization temperatures to effect desulphurization thereof, with the coke reaching a temperature of at least 1000° C. during desulphurization, and cooling the coke to below coke desulphurization temperatures, with such cooling being effected by direct contact with a gas and, all or a portion of the heating being provided by direct contact with the gas, with the heat released from the coke during cooling being recuperated by the gas and employed to supply most of the heat required to bring the coke to desulphurization temperatures. The gas and/or coke is heated between the heating and cooling steps to maintain the gas at a temperature below the temperature of the coke during the direct countercurrent contact cooling of the coke and above the temperature of the coke during the direct countercurrent contacting of the coke.

The coke during desulphurization should reach a temperature of at least 1000° C., preferably at least 1100° C. and, most preferably at least 1200° C. Applicant has surprisingly found that by proceeding in accordance with the present invention, it is possible to provide for effective desulphurization without the coke temperature exceeding a temperature of 1600° C., whereby desulphurization is effected at temperatures lower than those heretofore thought possible in the art. In most cases, during desulphurization, the coke reaches a temperature in the order of from 1300° C. or 1350° C. to about 1550° C. As should be apparent, for economic reasons, desulphurization should be effected at the lowest temperature possible. It is also to be understood that although in accordance with the present invention it is possible to provide effective desulphurization without the coke temperature reaching a temperature of 1600° C.; i.e., at temperatures of less than 1600° C., it is possible to heat the coke to temperatures of 1600° C. and greater to effect desulphurization. In other words, although a primary advantage of the present invention is the use of lower desulphurization temperatures than previously used in the art, it is possible to practise the present invention at the higher desulphurization temperatures previously used in the art, although such an operation is not preferred.

In effecting desulphurization, in some cases, the coke is not maintained at a constant temperature during the desulphurization; e.g., in the case where the coke is further heated subsequent to being heated by the gas and prior to being cooled by the gas. Accordingly, the terminology with respect to maintaining or soaking the coke at desulphurization temperatures encompasses a changing temperature profile (increasing and/or decreasing) as well as a constant temperature profile. As hereinabove noted, one of the advantages of the present invention is that it is possible to provide for effective desulphurization without the coke reaching a temperature of 1600° C. which was heretofore believed to be a bare minimum temperature for effective desulphurization, with the desulphurization in prior art processes generally being effected at temperatures well in excess of 1600° C.

The coke is maintained at desulphurization temperatures for a time sufficient to effect the desired reduction in sulphur content (higher temperatures require shorter times). In general, the coke is maintained at desulphurization temperatures for a period of time in the order of from 1 to 10 hours. It is to be understood that longer times could be employed, and in some cases, at higher temperatures shorter times could be employed. The soaking time, as should be apparent, is dependent upon temperature, sulphur content of the coke feed and desired sulphur reduction, and the selection of a suitable time is deemed to be within the scope of those skilled in the art from the teachings herein. In general, the reference to soaking times refers to the time period between the heating and cooling of the coke by the gas.

The desulphurization is effected under reducing conditions, although oxygen may be introduced into the desulphurization zone; however, such oxygen introduction is not sufficient to change the reducing conditions of the desulphurization zone.

The gas employed for effecting direct countercurrent contact heating and cooling of the coke is at a temperature below the coke temperature during the cooling step, and at a temperature above the coke temperature during the heating step, and in order to maintain such temperature differentials, the coke and/or gas is heated between the heating and cooling steps. Heating may be conveniently effected by heating the gas in a furnace or by injection of pre-heated air, which effects partial combustion of combustible components released from the coke and present in such gas. The coke may be conveniently heated between the heating and cooling steps by injection of super-heated air or by electrical heating; i.e., resistive heating of the coke. The above are only representative examples of means for effecting heating of the coke and/or gas, and the use of other procedures for effecting such heating should be apparent to those skilled in the art from the teachings herein.

The average temperature approach (difference between gas and coke temperatures) in the cooling and heating steps is a function of the linear gas velocity, gas properties, coke particle size and the dimensions of the desulphurization reaction zone. In general, the process is operated in a manner to achieve temperature approaches in the order from about 15° C. to about 250° C. with the equipment being preferably designed for a temperature approach in the order of from 30° C. to 150° C.

The temperature approach during the heating and/or cooling steps may not be uniform in that volatiles are evolved from the coke which increases gas flow, and in addition, cracking reactions occur which require a greater heat duty and gas flow during the heating step in order to achieve a more or less even temperature approach. Increased gas flow can be accomplished by injecting additional gas to the hot gas after the cooling step. The temperature approach may be allowed to spread at one end of the heating and/or cooling zone.

Thus, for example, a large amount of circulating gas can be introduced into the cooling portion to provide a more or less uniform temperature approach during the heating, whereby gas issuing from the cooling step would be at a lower temperature. As another alternative, it is possible to use an amount of gas necessary to maintain a more or less uniform temperature approach during cooling, whereby the gas from the cooling portion is heated to a higher temperature, resulting in a greater temperature approach at the coke exit end of the heating portion of the desulphurization process.

In accordance with the present invention, the bulk of the heat required to reach the desulphurization temperature is supplied by recuperation of the heat rejected from the cooling of the hot coke, whereby it is possible to effect the desulphurization with the only net heat input being the high temperature level energy introduced to the hot coke and/or gas between the cooling and heating functions effected by contact with the gas. Such heat energy is roughly equivalent to twice the average temperature approach plus the heat of devolatization plus the equipment heat loss.

The coke which is introduced into the heating end of the desulphurization reactor is generally introduced at a temperature in the order of from about 20° C. to about 550° C., and preferably a temperature in the order of from about 340° C. to about 400° C. In the heating portion of the desulphurization reactor, the coke is heated to a temperature whereby during the desulphurization the coke reaches a temperature of at least 1000° C., preferably at least 1100° C., most preferably at least 1200° C., as hereinabove described. Some agglomeration of the coke particles may occur during the desulphurization process, and as a result, the equipment should be designed to insure free flow of coke therethrough; i.e., the desulphurization reactor should contain fairly large diameter passages and/or a lump breaker can be installed therein. In accordance with one embodiment, the raw coke may be pre-treated with gases containing oxygen (or air), at a temperature of from about 300° C. to about 550° C., preferably from about 325° C. to about 400° C. with the treated gas containing up to 10 volume percent oxygen, preferably 0.5 to 5 volume percent oxygen. After such pre-treatment, the coke particles may be pre-heated without experiencing agglomeration.

The gas which is employed to effect direct countercurrent contact cooling and heating of the coke is introduced into the cooling end of the desulphurization reactor, with such gas generally being introduced at a temperature in the order of from about 20° C. to about 80° C., and preferably from about 30° C. to about 50° C. Such gas is then heated by the desulphurized coke and the heat recuperated from the coke by the gas is then employed to provide the bulk of the heat required to effect heating of the coke to desulphurization temperatures in the heating portion of the desulphurization reactor.

In accordance with a preferred embodiment, gas withdrawn from the heating end of the desulphurization reactor is recirculated to the cooling end of the reactor to thereby recycle to the cooling step a part of the volatiles released from the coke during the heating step with such volatiles; in particular hydrogen produced from high temperature cracking of hydrocarbons, accentuating the desulphurization of the coke. Such gas is generally treated prior to recirculation thereof in order to remove acid gases, reduce water partial pressure (water reacts endothermically with carbon, which increases the heat requirements) and to reduce the tar and solid content thereof.

The process of the present invention may be effected in a wide variety of equipment presently available in the art, with such process preferably being effected in a shaft kiln, with the coke flowing downwardly through the kiln, and the gas upwardly therethrough.

The coke which is treated in accordance with the present invention may be derived from any one of a wide variety of sources, including petroleum sources, such as a petroleum crude residue, gilsonite, tar sand bitumen and the like; or a coal source, such as coal tar, coal tar pitch, a coal liquefaction product or coal itself. The coke may be produced by any one of a wide variety of coking processes, including delayed coking, fluid coking or by carbonization.

The coke may have a sulphur content in the order of from about 2 weight percent to about 9 weight percent. In accordance with the present invention, the sulphur is reduced to an amount consistent with the desired end use for the coke. In accordance with the present invention, it is possible to provide a desulphurized coke having a sulphur content in the order of from about 0.2 weight percent to about 3 weight percent or less, and most generally in the order of from about 0.5 weight percent to about 2.5 weight percent.

The invention will be further described with respect to embodiments thereof illustrated in the accompanying drawings wherein.

Figure 1:
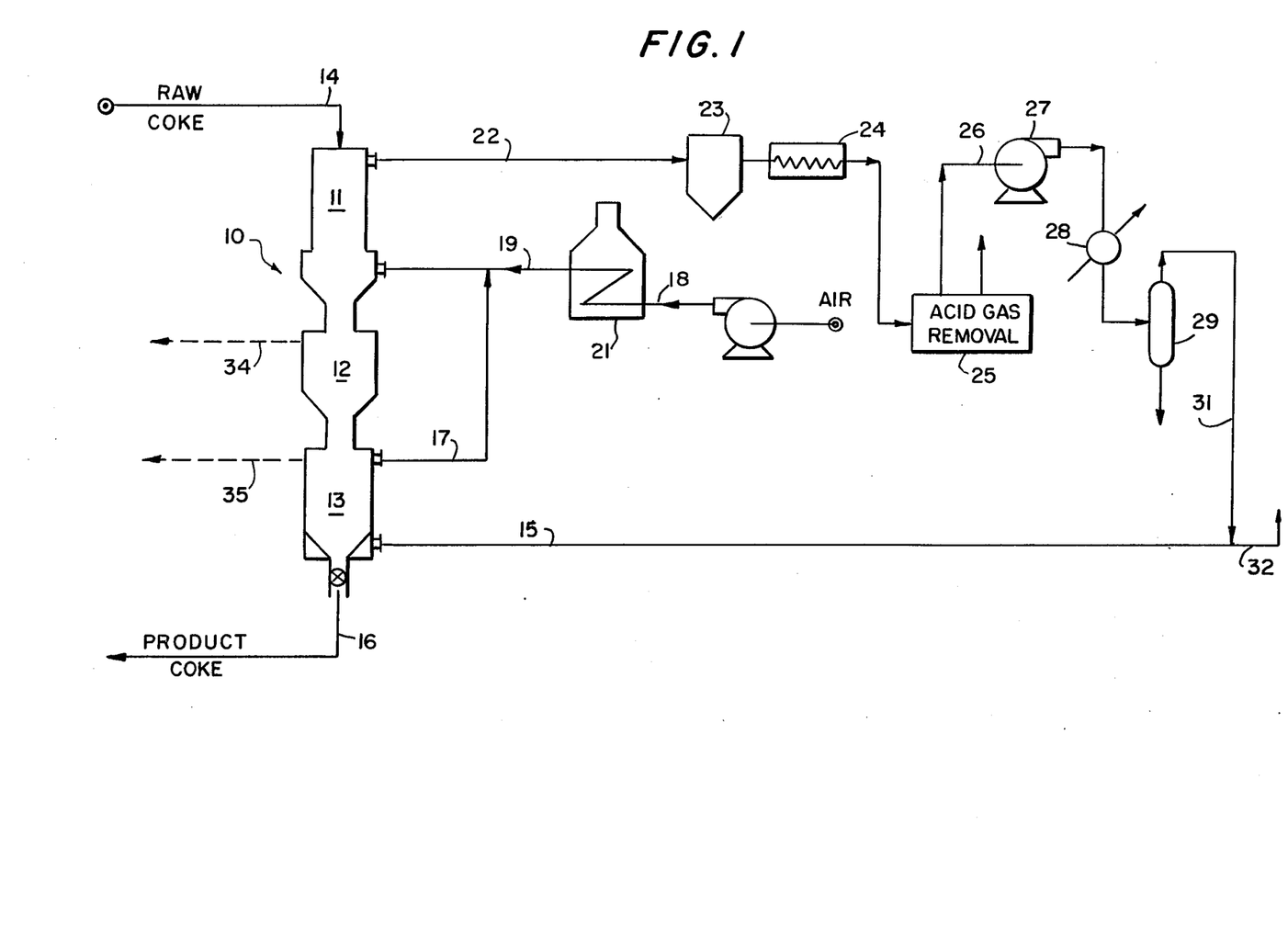
FIG. 1 is a simplified schematic flow diagram of an embodiment of the present invention.

Referring now to the drawings, there is shown, in simplified schematic form, a desulphurization reactor, generally indicated as 10. The desulphurization reactor 10 includes a top heating zone 11; a middle soaking zone 12 wherein the coke is maintained at desulphurization temperatures to effect desulphurization of the coke; and a coke cooling zone 13, wherein the coke is cooled to below desulphurization temperatures.

Coke to be desulphurized is introduced into the top of heating zone 11 through line 14, and gas employed to effect direct countercurrent contact cooling and heating of the coke is introduced into the bottom of cooling zone 13 through line 15. In accordance with the preferred embodiment, the gas in line 15 is a recirculating cycle gas, which includes nitrogen, volatile combustible matter derived from the coke, hydrogen, some carbon monoxide and water vapor. The gas introduced through line 15 flows in direct countercurrent contact with the coke introduced into reactor 10 through line 14 to effect heating of the coke to a temperature whereby desulphurization is effected in section 11, with the gas deriving the bulk of the heat required to effect such heating from cooling of the hot coke in section 13. It is to be understood that other gases could be employed as long as such gases do not adversely affect the coke and the selection of a suitable gas is within the scope of those skilled in the art from the teachings herein.

The gas introduced into section 13 is at a temperature below the temperature of the coke in section 13, and as a result, such gas effects cooling of the coke, with the gas recuperating the heat from such coke. The volatile combustible matter present in the gas introduced through line 15 is cracked at the elevated temperatures which are reached in section 13 to thereby produce hydrogen, which increases coke desulphurization. Cooled coke, which is generally at a temperature in the order of from about 60° C. to about 100° C. is withdrawn from section 13 of the reactor 10 through line 16, and such coke is the desulphurized product coke of the process.

The gas at the exit end of section 13 is at a temperature below the temperature of the coke withdrawn from section 12, with such gas temperature preferably being in the order of from about 1100° C. to about 1450° C. In accordance with the illustrated embodiment, a major portion of such gas is bypassed around section 12 by passing the gas, for example, through a suitable gas bypass leg. Such a bypass leg is schematically indicated by line 17. Some of the gas passes through the coke bed maintained in the soaking section 12 and functions as a sweep gas.

In accordance with the illustrated embodiment, the gas is heated between the heating and cooling steps effected in sections 11 and 13 of the desulphurization reactor 10. In accordance with the illustrated embodiment, such gas is heated by injecting air in line 19, which has been pre-heated in heater 21 to thereby effect partial combustion of combustible components present in the gas in line 17. Such heated gas, which is now at a temperature above the temperature of the coke in section 11, is introduced into the bottom portion of section 11 wherein the gas effects direct countercurrent contact heating of the coke in section 11 to thereby raise the temperature of the coke introduced through line 14 to a temperature to achieve desulphurization in section 12. The coke which has been heated in section 11 passes through soaking section 12 wherein the coke is maintained at desulphurization temperatures for a time sufficient to effect the required desulphurization.

Gas is withdrawn from section 11 of desulphurization reactor 10 through line 22 and such gas is generally at a temperature in the order of from about 70° C. to about 600° C., with the particular temperature being dependent upon the temperature of the coke fed through line 14, the manner in which heat is introduced between the heating and cooling sections, the amount of gas employed and whether or not air is employed to effect heating of gas between sections 11 and 13. The gas in line 22 generally contains acid gases (mainly hydrogen sulphide and carbon oxysulphide), volatile combustible matter of raw coke, some tars and solids, hydrogen, carbon monoxide, as well as nitrogen introduced with the air. Gas in line 22 is preferably passed through a knock-out drum 23 and then through a cooler 24, prior to introduction into an acid gas removal system schematically generally indicated as 25. Such acid gas removal may be conveniently effected by an absorption process, as known in the art.

The gas withdrawn from the acid gas separation system 25, in line 26, is then compressed by circulating compressor 27 and cooled in cooler 28 to reduce the water partial pressure, with such water being separated in a separator, schematically indicated as 29. The cooled gas in line 31 is then recirculated to section 13 through line 15, with the excess of cooled gas over that required in section 13 being purged through line 32, with such gas being suitable for use as a fuel.

The processing scheme may be varied in numerous ways within the spirit and scope of the present invention. Thus, for example, a portion of the gas subsequent to cooling of the coke in section 13, may be withdrawn from the process through either line 34 or 35. The gas withdrawn from line 35 may be combusted directly as fuel. If such gas is initially passed through soaking section 12 and withdrawn through line 34, such gas will contain most of the sulphur rejected from the coke, and such gas will contain hydrogen sulphide, which is preferably removed from the gas prior to combustion thereof. Furthermore, by employing such an alternative, the heat capacity of the gas introduced into section 11 can be balanced with that of the descending coke so that the gas withdrawn from section 11 is at a lower temperature.

As a further alternative, heat can be provided to the coke between sections 11 and 12, whereby combustion air is not introduced into the gas which flows from section 13 to section 11. Such heating of the coke may be conveniently effected by electrical resistive heating, with such coke being resistively heated in passage from section 11 to section 12 by the use of suitable hot and grounded electrodes. In the case where air is not injected into the gas stream, the recirculating gas composition will consist essentially of hydrogen and carbon monoxide. As a result, in order to increase the safety of handling and to provide for easier compression thereof, some air injection, in some cases, may be combined with such electric heating. The air injection is generally small so that the gas remains strongly reducing and there is no significant consumption of carbon in the coke. In such a case, some of the heat required between the heating and cooling sections is provided by the air injection, with the major portion of the heat being provided to the coke by electric heating.

Figure 2:
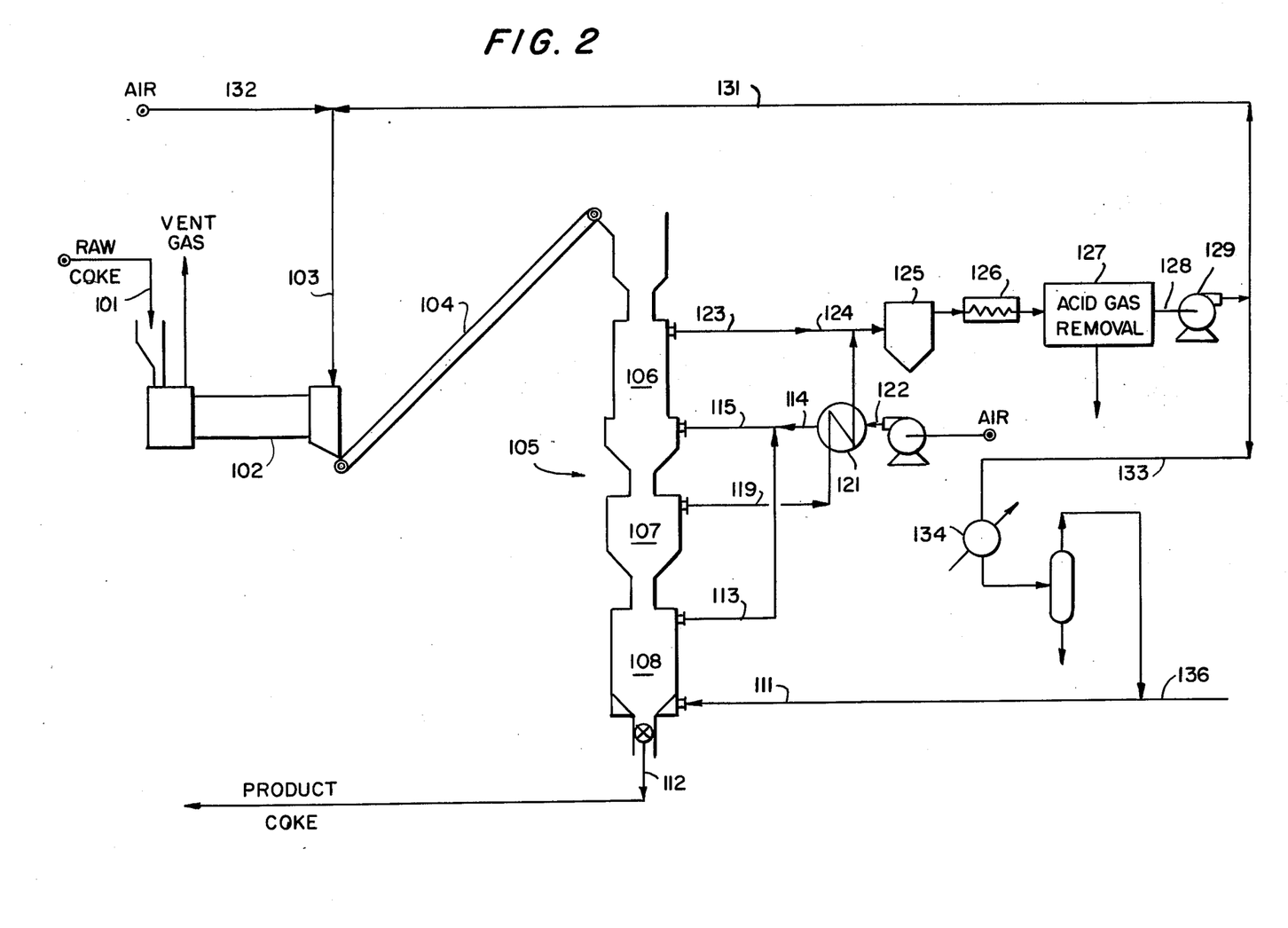
FIG. 2 is a simplified schematic flow diagram of a modification of the embodiment of FIG. 1.

A further modification of the present invention is illustrated in FIG. 2 of the drawings.

Referring to FIG. 2 of the drawings, coke in line 101 is pretreated in a rotary kiln, schematically generally indicated as 102 by effecting heating of the coke in the kiln to a temperature in the order to about 325° C. to about 400° C. with an oxygen containing gas. The preoxidation destroys the tackiness of the coke and prevents cluster formation at higher temperatures. The coke is heated in kiln 102 by direct contact with a heated oxygen containing gas introduced through line 103, and obtained as hereinafter described.

The pre-treated heated coke is withdrawn from kiln 102 through a suitable conveyor 104 and introduced into the heating section of the desulphurization reactor schematically generally indicated as 105. The desulphurization reactor 105 is as described with respect to the embodiment of FIG. 1, and includes a heating section 106, a soaking section 107 and cooling section 108.

Gas is introduced into the cooling section 108 through line 111 to effect direct countercurrent contact cooling of coke in section 108, with cooled desulphurized coke being withdrawn from section 108 through line 112.

In accordance with the illustrated embodiment, a portion of the gas, subsequent to cooling of the coke in line 113, is heated by introduction of pre-heated combustion air in line 114, with the heating gas in line 115 being introduced into the heating section 106 in order to effect heating of the coke to temperatures to achieve desulphurization in section 107.

The remaining portion of the gas is recovered from section 107 through line 119, with the relative portions of the gas in lines 113 and 119 being adjusted to provide a more or less uniform temperature approach in heating section 106. The gas in line 119 is passed through an exchanger 121 to effect heating of combustion air in line 122 which is subsequently combined with the gas in line 113.

Gas withdrawn from section 106 through line 123 is combined with the gas in line 119, subsequent to cooling thereof in cooler 121, and the combined streams pass through knockout drum 125, cooler 126 and acid gas removal system 127, as hereinabove described with respect to the embodiment of FIG. 1. The gas, removed from acid gas removal zone 127 in line 128 is compressed by circulating compressor 129, and a portion thereof, in line 131, is combusted with air in line 132 to provide the gas for the rotary kiln in line 103. The air introduced through line 132 is adjusted to provide the oxygen requirements for kiln 102; i.e., up to 10 volume percent oxygen, and preferably 0.5 to 5 volume percent oxygen after combustion.

The remaining portion of the gas, from line 128, which has been compressed by circulating compressor 129, is passed through line 133 wherein the gas is cooled in cooler 134 to reduce the partial pressure of water, with such gas ultimately being recycled through line 111 after purging of excessive gas through line 136 as hereinabove described with respect to the embodiment of FIG. 1.

The invention will be further described with respect to the following examples; however, the scope of the invention is not to be limited thereby:

EXAMPLE

Figure 3:
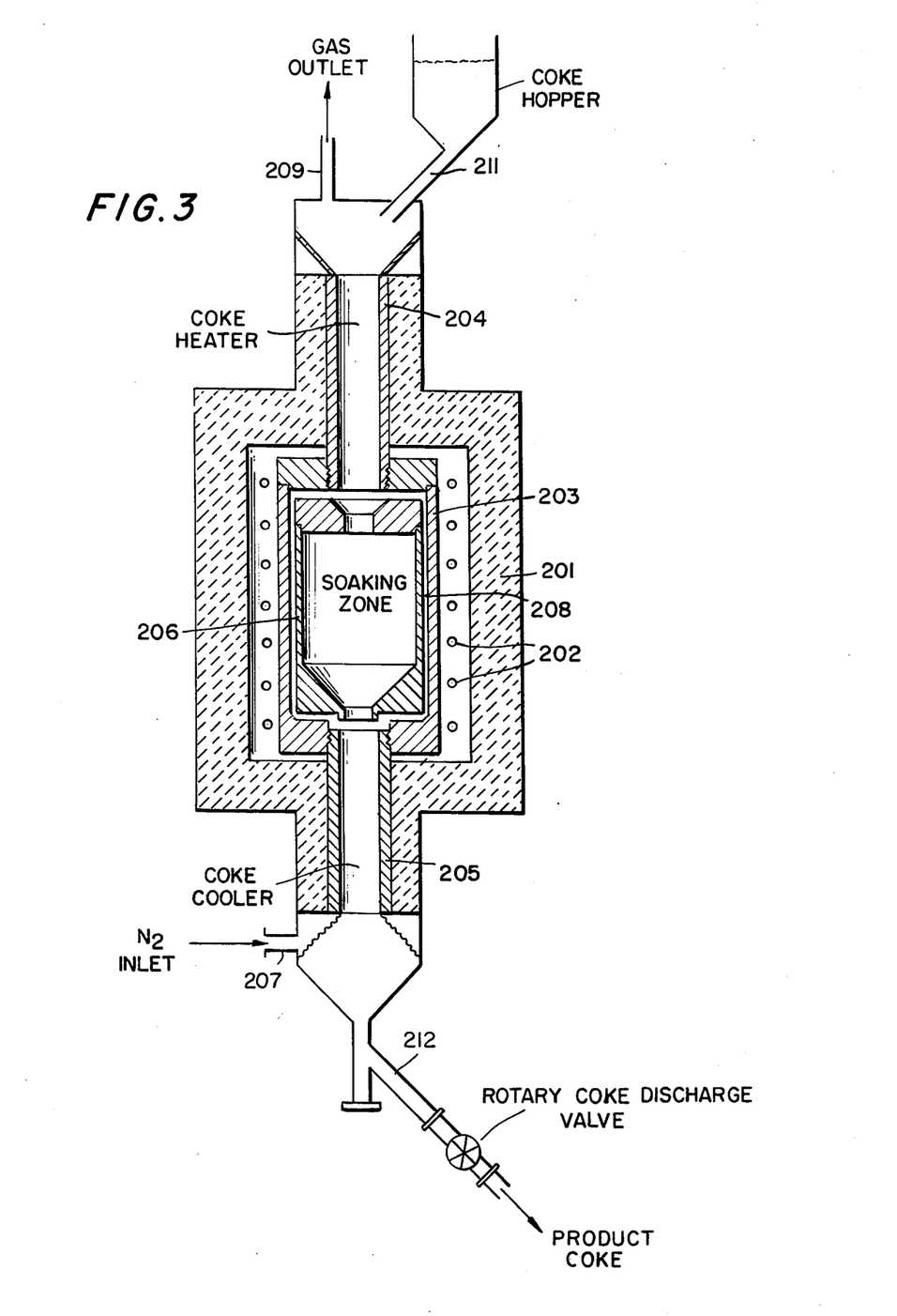
FIG. 3 is a simplified drawing of experimental apparatus employed for effecting desulphurization in accordance with the present invention.

Coke is desulphurized in accordance with the present invention employing experimental apparatus, as shown in FIG. 3. In brief, such apparatus is comprised of a furnace 201, which is electrically heated by means of silicon carbide electrical resistors 202. The interior of the furnace includes a coke desulphurization reactor comprised of a cylindrical outer shell 203 to which is threaded a top tube 204 and a bottom tube 205. The cylindrical shell 203 includes a graphite cylinder 206 which is spaced from the shell 203. The top tube 204 comprises the heating zone, the bottom tube 205 comprises the cooling zone and the graphite cylinder 206 is included in the desulphurization zone.

Nitrogen gas, which is introduced into the bottom tube 205 through inlet 207, flows upwardly through the bottom tube 205 and then preferentially flows through the annular space 208 between cylinder 206 and shell 203 wherein the gas is heated by the furnace. A minor quantity of the gas flows through the inner cylinder 206. The gas then flows through upper tube 204 and is withdrawn through outlet 209.

Coke is introduced into the top tube 204 through inlet 211 and then flows sequentially through top tube 204, cylinder 206 and bottom tube 205 wherein the desulphurized coke is withdrawn through outlet 212. The coke is also heated in cylinder 206.

The apparatus is employed to desulphurize raw petroleum coke having a sulphur content of 4.7 weight percent. The temperatures reported are furnace temperatures and the temperature of the coke in the soaking zone (cylinder 206) is lower than the reported furnace temperature. The coke temperature at the outlet of cylinder 206 is in the order of from about 80° C. to 100° C. lower than the furnace temperature.

The following presents the results in tabular form:

TABLE I

| | EXPERIMENTAL RESULTS | | | | |
|---|---|---|---|---|---|
| RUN NO. | COKE SIZE INCHES | FEED RATE Kg/h | FURNACE TEMPERATURE °C. | SOAKING TIME HOURS | SULPHUR CONTENT OF PRODUCT WT.% |
| 1 | ¼ × ⅛ | 9.77 | 1320 | 2.9 | 2.63 |
| 2 | ¼ × ⅛ | 3.92 | 1320 | 8.7 | 1.65 |
| 3 | ¼ × ⅛ | 13.25 | 1370 | 3.3 | 1.88 |
| 4 | ¼ × ⅛ | 7.40 | 1400 | 6.0 | 1.09 |
| 5 | ¼ × ⅛ | 4.91 | 1400 | 9.0 | 0.90 |
| 6 | ¼ × ⅛ | 5.77 | 1415 | 5.7 | 1.05 |
| 7 | ¼ × ⅛ | 4.07 | 1415 | 8.1 | .90 |
| 8 | ¼ × ⅛ | 4.72 | 1500 | 9.4 | .49 |

Numerous modifications and variations of the present invention are possible in light of the above teachings and, therefore, within the scope of the appended claims, the invention may be practised otherwise than as particularly described.

What is claimed:

1. A process for effecting desulphurization of a sulphur containing coke, comprising:
sequentially heating coke to coke desulphurization temperatures, soaking said coke at coke desulphurization temperatures to effect desulphurization thereof, said coke reaching a temperature of at least 1000° C. during said desulphurization, and cooling said coke to below the desulphurization temperature, said cooling being effected by passing a gas in direct contact with said coke, said gas being at a temperature below the temperature of said coke during said cooling, at least a portion of said heating of the coke being effected by passing said gas subsequent to said cooling in direct contact with said coke with the gas being at a temperature above the temperature of said coke, at least one of said coke and said gas being heated between said direct contact heating and cooling, whereby heat released from the cooling is recuperated by said gas and employed to provide most of the heat required to heat to desulphurization temperatures, said gas employed for said cooling and heating of the coke being a recycle gas provided by recycling at least a portion of the gas recovered from the direct contact heating to the direct contact cooling, said recycle gas consisting essentially of nitrogen and hydrogen and combustible matter derived from the coke.

2. The process of claim 1 wherein said coke during desulphurization reaches a temperature of at least 1100° C.

3. The process of claim 2 wherein said coke during desulphurization reaches a temperature of at least 1200° C.

4. The process of claim 3 wherein the coke temperature during desulphurization does not exceed a temperature of 1600° C.

5. The process of claim 1 wherein said coke is heated between said direct contact heating and cooling.

6. The process of claim 1 wherein said gas is heated between said direct contact heating and cooling.

7. The process of claim 1 wherein both the gas and coke are heated between said direct contact heating and cooling.

8. The process of claim 1 wherein the desulphurization is effected under reducing conditions.

9. The process of claim 1 wherein the direct contact heating and direct contact cooling are each effected in a manner to achieve a temperature approach of from about 15° C. to about 250° C.

10. The process of claim 1 wherein the desulphurization provides a coke with a sulphur content of from about 0.2 weight percent to about 3 weight percent.

11. The process of claim 1 wherein the coke is preoxidized to avoid clustering of the coke during desulphurization.

12. The process of claim 1 wherein a major portion of the gas is maintained out of contact with the coke during the soaking.

13. The process of claim 1 wherein the gas is heated between the heating and cooling by adding pre-heated air to said gas which effects partial combustion of combustibles released from the coke and present in the gas.

14. A process for effecting desulphurization of a sulphur containing coke, comprising:
sequentially heating coke to coke desulphurization temperatures, soaking said coke at coke desulphurization temperatures to effect desulphurization thereof, said coke reaching a temperature of less than 1600° C. during said desulphurization, and cooling said coke to below the desulphurization temperature, said cooling being effected by passing a gas in direct contact with said coke, said gas being at a temperature below the temperature of said coke during said cooling, at least a portion of said heating of the coke being effected by passing said gas subsequent to said cooling in direct contact with said coke with the gas being at a temperature above the temperature of said coke, at least one of said coke and said gas being heated between said direct contact heating and cooling, whereby heat released from the cooling is recuperated by said gas and employed to provide most of the heat required to heat the coke to desulphurization temperatures, said gas employed for said cooling and heating of the coke being a recycle gas provided by recycling at least a portion of the gas recovered from the direct contact heating to the direct contact cooling, said recycle gas consisting essentially of nitrogen and hydrogen and combustible matter derived from the coke.

15. The process of claim 14 wherein the desulphurization is effected under reducing conditions.

16. The process of claim 15 wherein the direct contact heating and direct contact cooling are each effected in a manner to achieve a temperature approach of from about 15° C. to about 250° C.

17. The process of claim 15 wherein the coke is preoxidized to avoid clustering of the coke during desulphurization.

18. The process of claim 15 wherein a major portion of the gas is maintained out of contact with the coke during the soaking.

19. The process of claim 1 wherein the coke is heated, soaked, and cooled as a continuously moving bed of coke.

20. The process of claim 1 wherein the coke is heated, soaked, and cooled as a bed moving continuously downwardly through a shaft kiln and said gas effects cooling and heating by moving upwardly through the shaft kiln.

21. The process of claim 15 wherein the coke is heated, soaked, and cooled as a continuously moving bed of coke.

22. The process of claim 15 wherein the coke is heated, soaked, and cooled as a bed moving continuously downwardly through a shaft kiln and said gas effects cooling and heating by moving upwardly through the shaft kiln.

* * * * *

UNITED STATES PATENT AND TRADEMARK OFFICE
CERTIFICATE OF CORRECTION

PATENT NO. : 4,203,960

DATED : May 20, 1980

INVENTOR(S) : William V. Bauer et al.

It is certified that error appears in the above—identified patent and that said Letters Patent is hereby corrected as shown below:

On the Title Page the Assignee should read

-- The Lummus Company , Bloomfield, New Jersey and

Instituto Mexicano Del Petroleo, D.F., Mexico, part interest each --.

Signed and Sealed this

Thirtieth Day of September 1980

[SEAL]

Attest:

SIDNEY A. DIAMOND

Attesting Officer     Commissioner of Patents and Trademarks

UNITED STATES PATENT OFFICE
CERTIFICATE OF CORRECTION

Patent No. 4,203,960                Dated May 20, 1980

Inventor(s) William V. Bauer, Jose A. Celestinos Isaacs and Oliverio Moreno Lamonte.

It is certified that error appears in the above-identified patent and that said Letters Patent are hereby corrected as shown below:

ON THE TITLE PAGE:

Please correct the names of the two inventors as follows:

"Jose A.C. Isaacs" should read --JOSE A. CELESTINOS ISAACS--

"Oliverio M. Lamonte" should read -- OLIVERIO MORENO LAMONTE--

Signed and Sealed this

Fourth Day of January 1983

[SEAL]

Attest:

GERALD J. MOSSINGHOFF

Attesting Officer      Commissioner of Patents and Trademarks